United States Patent
Ding et al.

(10) Patent No.: US 12,152,044 B2
(45) Date of Patent: Nov. 26, 2024

(54) ZIRCONIUM-BASED METAL-ORGANIC FRAMEWORK MATERIAL AND PREPARATION METHOD THEREOF

(71) Applicant: ZHEJIANG UNIVERSITY, Zhejiang (CN)

(72) Inventors: Tian Ding, Hangzhou (CN); Dan Wu, Hangzhou (CN); Mofei Shen, Hangzhou (CN); Donghong Liu, Hangzhou (CN); Enbo Xu, Hangzhou (CN)

(73) Assignee: ZHEJIANG UNIVERSITY

( * ) Notice: Subject to any disclaimer, the term of this patent is extended or adjusted under 35 U.S.C. 154(b) by 470 days.

(21) Appl. No.: 17/617,266

(22) PCT Filed: Jun. 11, 2020

(86) PCT No.: PCT/CN2020/095502
§ 371 (c)(1),
(2) Date: Dec. 7, 2021

(87) PCT Pub. No.: WO2021/169084
PCT Pub. Date: Sep. 2, 2021

(65) Prior Publication Data
US 2022/0227793 A1    Jul. 21, 2022

(30) Foreign Application Priority Data
Feb. 25, 2020    (CN) .......................... 202010114968.2

(51) Int. Cl.
C07F 7/00 (2006.01)
C01B 37/00 (2006.01)
C25B 1/04 (2021.01)
C25B 9/19 (2021.01)
C25B 13/00 (2006.01)

(52) U.S. Cl.
CPC ................ *C07F 7/00* (2013.01); *C01B 37/00* (2013.01); *C25B 1/04* (2013.01); *C25B 9/19* (2021.01); *C25B 13/00* (2013.01)

(58) Field of Classification Search
CPC .. C25B 1/04; B01J 20/226; C07F 7/00; C01B 37/00
See application file for complete search history.

(56) References Cited

FOREIGN PATENT DOCUMENTS

CN    105037404 A    * 11/2015

OTHER PUBLICATIONS

J. Qiu, et al, 499 Journal of colloid and interface science 151-158 (2017) (Year: 2017).*
Sigma Zirconium Chloride Safety date sheet (Year: 2024).*
Sigma terephthalic acid Safety date sheet (Year: 2024).*

* cited by examiner

*Primary Examiner* — Alexander R Pagano
*Assistant Examiner* — Frank S. Hou
(74) *Attorney, Agent, or Firm* — Bochner PLLC; Andrew Bochner; Eric R Kleinertz (57) ABSTRACT

Disclosed are a zirconium-based metal-organic framework material and a preparation method thereof. Plasma-activated water or strong acid electrolyzed water is added to a raw material system for preparing a zirconium-based metal-organic framework material UiO-66, and they are then subjected to a reaction to obtain a crude product. The crude product is subjected to a post-treatment to obtain the zirconium-based metal-organic framework material UiO-66.

8 Claims, 4 Drawing Sheets

ZIRCONIUM-BASED METAL-ORGANIC FRAMEWORK MATERIAL AND PREPARATION METHOD THEREOF

CROSS REFERENCE TO RELATED APPLICATION

This patent application claims the benefit and priority of Chinese Patent Application No. 202010114968.2 filed on Feb. 25, 2020, the disclosure of which is incorporated by reference herein in its entirety as part of the present application.

TECHNICAL FIELD

The present disclosure relates to the technical field of the preparation of metal-organic framework materials, and in particular to a method for rapidly synthesizing UiO-66 with a smaller size by using plasma-activated water or strong acid electrolyzed water.

BACKGROUND ART

Metal-Organic Frameworks (MOFs) are composed of functionalized organic ligands with multifunctional groups such as terephthalic acid and trimesic acid, which are centered on metal ions or metal clusters, and are porous materials with a three-dimensional periodic grid structure of regular nanopores. They have the advantages of large specific surface area, tailorability of crystal structure, and adjustable aperture size, and have become a new kind of porous crystal material which has been developed rapidly in recent years. For example, a Chinese patent with the publication number CN104497055B discloses a method for preparing a metal-organic framework material, in which a metal-organic framework material, i.e. a metal-organic framework MOF (Fe) material, is synthesized by a hydrothermal method or a heating reflux method.

MOFs have good chemical stability, thermal stability, porous structure, and have a wide range of applications. The zirconium-based metal-organic framework UiO-66 (University of Oslo) is a porous material with an 11 Å octahedral cage structure and an 8 Å tetrahedral structure face-centered cubic crystal structure. It is composed of $Zr_6O_4(OH)_4$ and terephthalic acid (BDC). In UiO series MOF, carboxylic acid compounds act as the organic ligand. Because of large negative charge density, the carboxyl group could be coordinated easily with metal cations, forming a kind of MOF with the best stability.

At present, UiO-66 is mostly synthesized by a solvothermal method. For example, the Chinese patent application with publication number CN 108671892A discloses a metal-organic framework UiO-66 adsorbent and a modified material thereof. The adsorbent was prepared by a traditional solvothermal method. The zirconium source was mixed with an organic ligand and then the resulting mixture was dissolved in a solvent; after being completely dissolved, they were added to a polytetrafluoroethylene-lined stainless steel reactor, and reacted therein; the mixture obtained after the reaction was washed with an organic solvent, and filtered; the obtained solid was dried to obtain the target adsorbent. The traditional solvothermal method takes a long time, has low yield and requires high temperature for reaction, and its good properties are difficult to be industrially applied. There are also some methods including a layered diffusion method, etc., which have the shortcomings that the time for reaction is as long as several weeks or even months, and the product particles are large and non-uniform.

SUMMARY

In view of the deficiencies in the field, the present disclosure provides a method for preparing a zirconium-based metal-organic framework material UiO-66, which has the advantages of mild reaction conditions, short time for reaction, efficiency and high yield, and the UiO-66 prepared by the same has a smaller particle size and uniform size.

Disclosed is a method for preparing a zirconium-based metal-organic framework material, including
adding plasma-activated water or strong acid electrolyzed water to a raw material system for preparing a zirconium-based metal-organic framework material UiO-66, and subjecting the resulting mixture to a reaction to obtain a crude product, and
subjecting the crude product to a post-treatment to obtain the zirconium-based metal-organic framework material UiO-66.

The plasma-activated water, which is prepared from pure water, contains active substances such as hydrogen peroxide and free radicals, as well as ions such as nitrite and nitrate ions. UiO-66 with a smaller size could be quickly synthesized by adding plasma-activated water. Strong acid electrolyzed water is usually prepared in an ion-exchange membrane electrolyzer, in which a certain concentration of saline solution (with a mass concentration of less than 10 g/L) is added and an electrolysis is performed at a certain current density. In this way, strong acid electrolyzed water is obtained on the anode side, the main components of which are chlorine, hypochlorous acid, hypochlorite, hydrochloric acid, dissolved oxygen and ozone, etc., and which has a pH value of 2-5. It is added to the reaction precursor liquid for the synthesis of UiO-66, which greatly saves the energy consumption required for the reaction compared with the solvothermal method. The temperature for reaction is reduced from 120° C. to 80° C., and the time for reaction is shortened from 24 h to not more than 10 min. The method could be carried out in an open container, does not require excessive pressure, temperature and time, has good repeatability, and allows for green, efficient, and stable synthesis.

Compared with the prior art, the present disclosure has at least one of the following advantages: reduced temperature for reaction, shortened crystallization time, simple operation, mild reaction conditions, environmental friendliness, low cost, high reaction yield, etc., and it is easy to realize industrial production.

Several alternative embodiments are also provided below, but they are not intended as additional limitations on the above overall solutions, but merely further additions or optimizations. Without technical or logical contradiction, each alternative embodiment could be combined with the above overall solution separately, or two or more alternative embodiments could be combined with each other.

The temperature for reaction could be controlled by heating, water bath or other means. In some embodiments, the temperature is controlled by carrying out the reaction in a water bath.

Optionally, the reaction system is reacted at a temperature of at 70-80° C. for 5-10 min. Product generated could be observed when the reaction is performed for 5 min, and the reaction could be completed when the reaction is performed for 10 min.

Optionally, a volume ratio of the plasma-activated water or strong acid electrolyzed water to the raw material system is in the range of 0.8-1.5:21. Further, the volume ratio of the plasma-activated water or strong acid electrolyzed water to the raw material system is 1:21.

Optionally, the raw material system includes a zirconium salt, an organic ligand, an organic solvent, and glacial acetic acid.

Optionally, a molar ratio of the zirconium salt, the organic ligand, and glacial acetic acid is in the range of 1-5:1:60-100. Further, a molar ratio of the zirconium salt, the organic ligand, and glacial acetic acid is in the range of 1-5:1:60-80.

Optionally, on the basis of the above reaction system, the plasma-activated water has a volume the same as the glacial acetic acid, with a proviso that a volume ratio of the plasma-activated water to the raw material system is in the range of 0.8-1.5:21.

Optionally, the zirconium salt is zirconium tetrachloride; the organic ligand is terephthalic acid.

Optionally, the zirconium salt and the organic ligand are dissolved in a mixture of the organic solvent, glacial acetic acid and plasma-activated water respectively Optionally, the zirconium salt and the organic ligand are mixed and stirred to be uniform; or they are dissolved in a mixture of the organic solvent, glacial acetic acid and strong acid electrolyzed water respectively, and they are mixed and stirred to be uniform.

Optionally, the plasma-activated water has a pH value of 0-5 and an oxidation-reduction potential of 250-500 mV.

Optionally, the plasma-activated water is prepared by a process comprising treating the deionized water continuously for 1-10 min by using a dielectric barrier discharge plasma generator.

Optionally, the strong acid electrolyzed water has an available chlorine of 100-200 mg/L, a pH value of 2.0-5.0, and an oxidation-reduction potential of 750-900 mV.

Optionally, the strong acid electrolyzed water is prepared by a process comprising adding NaCl and hydrochloric acid to water, dividing the resulting mixture into two parts and adding into an anode electrolyzer and a cathode electrolyzer respectively, applying a direct-current voltage between an anode electrode and a cathode electrode, performing an electrolysis under stirring, and taking acidic water from an anode side as product water.

Optionally, the post-treatment includes cooling the crude product, then subjecting the cooled crude product to a centrifugal separation to obtain a solid, washing the solid, and vacuum drying at 70-200° C. for 12-24 h.

The present disclosure also provides a zirconium-based metal-organic framework material prepared by the method as described in above technical solutions.

Optionally, the zirconium-based metal-organic framework material has a particle size of 18-60 nm. Under the condition that the plasma-activated water is used, the product has a particle size of 18-20 nm. Under the condition that the strong acid electrolyzed water is used, the product has a particle size of 20-40 nm.

The present disclosure has the following beneficial effects:

The method according to the present disclosure allows reducing the temperature for reaction from 120° C. to 80° C., and shortening the time for reaction from 24 h to not more than 10 min. The method could be carried out in an open container without excessive pressure, temperature and time, and it has good repeatability and allows for green, efficient and stable synthesis.

DETAILED DESCRIPTION OF THE EMBODIMENTS

The technical solutions in the embodiments of the present disclosure will be clearly and completely described below in conjunction with the drawings in the embodiments of the present disclosure. Obviously, the described embodiments are only a part of the embodiments of the present disclosure, rather than all the embodiments. Based on the embodiments in this disclosure, all other embodiments obtained by those of ordinary skill in the art without creative work shall fall within the scope of this disclosure.

Unless otherwise defined, all technical and scientific terms used herein have the same meaning as commonly understood by those skilled in the technical field of this disclosure. The terminology used in the specification of the disclosure herein is only for the purpose of describing specific embodiments, and is not intended to limit the disclosure.

In the method for preparing UiO-66 of the present disclosure, it is found that adding plasma-activated water or strong acid electrolyzed water to the reaction precursor liquid for the synthesis of UiO-66 greatly saves the energy consumption required for the reaction compared with the solvothermal method. Thereby, the temperature for reaction is dropped from 120° C. to about 80° C., and the time for reaction is shortened from 24 h to not more than 10 min.

The temperature for reaction could be controlled by heating, water bath and other means. In some embodiments, the temperature is controlled by performing the reaction in a water bath. The temperature of the water bath is controlled to be about 80° C.

In the present disclosure, by using plasma-activated water, the time for reaction could be shortened to be within 10 min, and in some embodiments, the time for reaction is in the range of 5-10 min.

In some embodiments, the volume ratio of plasma-activated water or strong acid electrolyzed water to the raw material system is 1:21.

The raw material system in this disclosure may be an existing heat-treated raw material system. In theory, the method of this disclosure is applicable to all existing UiO-66 raw material systems, and the main raw materials include a zirconium salts, a organic ligand, and an organic solvent. In some embodiments, the raw material system includes a zirconium salt, an organic ligand, an organic solvent, and glacial acetic acid. A molar ratio of the zirconium salt, the organic ligand, and glacial acetic acid is in the range of 1-5:1:60-100. Further, the molar ratio of the zirconium salt, the organic ligand, and glacial acetic acid is in the range of 1-5:1:60-80. On the basis of the reaction system, the plasma-activated water has a volume the same as glacial acetic acid, and meanwhile a volume ratio of the strong acid electrolyzed water to the reaction system is 1:21.

Solvent herein refers to a liquid that could dissolve a solid, liquid or gaseous solute to form a solution. Solvents are divided into two categories: inorganic solvents and organic solvents. Water is the most widely used inorganic solvent. Organic solvents are organic compounds containing carbon atom(s), which are liquid at room temperature and include many types of substances. Commonly used organic solvents include alkanes, alkenes, alcohols, aldehydes, amines, esters, ethers, ketones, aromatic hydrocarbons, hydrogenated hydrocarbons, terpene olefins, halogenated hydrocarbons, heterocyclic compounds, nitrogen-containing compounds, sulfur-containing compounds, and so on. As a solvent, it does not substantially participate in the reaction, and the amount of solvent is selected according to conventional requirements. In some embodiments, the organic solvent is selected from the group consisting of N,N-dimethylformamide, N,N-dimethylacetamide, acetonitrile, methanol, etc. In some embodiments, the organic solvent is N,N-dimethylformamide.

The main chemical component of the zirconium salt is zirconium. In some embodiments, the zirconium salt is a soluble zirconium salt, for example, zirconium tetrachloride, zirconium dichloride, zirconium oxychloride, zirconium oxide, zirconium acetate, zirconium carboxylate, or a mixture thereof. In some embodiments, the zirconium salt is zirconium tetrachloride.

Organic ligand(s) and zirconium metal ions in the zirconium salt(s) self-assemble through coordination bonds to form an organic-inorganic hybrid material with intramolecular pores. In some embodiments, the organic ligand is terephthalic acid, 1,2,4-benzenetricarboxylic acid, 1,2,4,5-benzenetetracarboxylic acid, or a mixture thereof. In some embodiments, the organic ligand is terephthalic acid.

Acetic acid, which is also called acetic acid or glacial acetic acid, has a chemical formula of $CH_3COOH$, and is an organic monobasic acid. Glacial acetic acid refers to acetic acid with an acetic acid content of more than 99.8%.

Glacial acetic acid is used as a regulator that affects the environment or the nucleation and growth of crystals in the synthesis of crystal materials, and affects the relative crystallinity and grain size of the metal-organic framework material. In the coordination process of metal ions and organic ligand(s), regulator(s) in an appropriate amount competes with metal ions for coordination, and replace part of the organic ligand(s) in the framework. The regulator which is coordinated with metal Zr ions is easy to decompose at high temperature, resulting in more ligand defect sites, thereby forming a more developed three-dimensional porous system. Formic acid, trifluoroacetic acid, propionic acid and benzoic acid etc. could all be used as the regulator.

Regarding the preparation of the raw material system, all the raw materials may be mixed and dissolved together, or the zirconium salt and the organic ligand may be dissolved in a mixture of N,N-dimethylformamide, glacial acetic acid and plasma-activated water or strong acid electrolyzed water respectively, and then they are mixed and stirred to be uniform. In some embodiments, the zirconium salt and the organic ligand are respectively dissolved in a mixture of N,N-dimethylformamide, glacial acetic acid, and plasma-activated water and then they are mixed and stirred to be uniform; or the zirconium salt, the organic ligand are respectively dissolved in a mixture of N,N-dimethylformamide, glacial acetic acid, and strong acid electrolyzed water and then they are mixed and stirred to be uniform. The zirconium salt and the organic ligand are dissolved separately and then they are mixed in the form of a solution to make the mixing more fully and achieve better dispersion. The stirring is performed for 3-10 min.

Plasma-activated water (PAW), which is also called plasma-treated water (PTW), refers to a liquid obtained by plasma discharge in water or on the surface of water. In some embodiments, the plasma-activated water is prepared by the following process: treating the deionized water continuously for 1-10 min by using a dielectric barrier discharge plasma generator. The dielectric barrier discharge plasma generator may be a commercially available equipment, such as the CTP-2000K type (Nanjing Suman Technology Co., Ltd., China). The treated plasma-activated water has a pH value of 0-5 and an oxidation-reduction potential of 250-500 mV.

The strong acid electrolyzed water is usually prepared in an ion-exchange membrane electrolyzer, in which a certain concentration of saline solution (with a mass concentration of less than 10 g/L) is added and an electrolysis is performed at a certain current density. In this way, the acidic electrolyzed oxidizing water is obtained on the anode side, the main components of which are chlorine, hypochlorous acid, hypochlorite, hydrochloric acid, dissolved oxygen, and ozone. The strong acid electrolyzed water has an available chlorine ($Cl_2$, HClO, $ClO^-$, etc.) of about 100-200 mg/L, a pH value of 2.0-5.0, and an oxidation-reduction potential of 750-900 mV. In some embodiments, the strong acid electrolyzed water is prepared by the following process: adding NaCl and hydrochloric acid to water, dividing the resulting mixture into two parts and adding into an anode electrolyzer and a cathode electrolyzer respectively, applying a direct-current voltage between the anode electrode and cathode electrode to perform an electrolysis under stirring, and taking acidic water from the anode side as the product water. To be more specific, 2 g of NaCl and 0.4 mL of hydrochloric acid are added to 4 L of water, and the resulting mixture is added to the left and right electrolyzers respectively: an electrolysis is performed for 10 min by using the circulating concentrated electrolyzed water generator: the acidic water is taken from the anode side as the product water, and then tested for the characteristics of the obtained electrolyzed water. The prepared electrolyzed water is stored in a brown sealed reagent bottle, and by adding different proportions of deionized water for dilution, electrolyzed water with different available chlorine concentrations could be obtained.

The post-treatment may be performed by a conventional post-treatment operation. In some embodiments, the post-treatment includes cooling the crude product, then subjecting the cooled crude product to a centrifugal separation, washing the obtained solid, and vacuum drying at 70-200° C. for 12-24 h.

The following examples are used for specific descriptions. In the following examples, the operations without specific conditions were usually performed in accordance with conventional conditions or in accordance with the conditions recommended by the manufacturer.

Plasma-activated water used in the following Examples 1-2 and Comparative Examples 1-3 was prepared according to the following procedures: deionized water was treated for 1 min continuously by using a dielectric barrier discharge plasma generator, and 50 mL of plasma-activated water was collected and stored in the dark for use.

Example 1

(1) Zirconium tetrachloride (600 mg, 2.57 mmol), terephthalic acid (86.25 mg, 0.519 mmol), N,N-dimethylformamide (40 mL), glacial acetic acid (2 mL) and plasma-activated water (2 mL) were added into a beaker, and they were stirred at room temperature for 3 min, and placed into a 100 mL beaker.

(2) The beaker was placed into a water bath at a temperature of 80° C. and the resulting mixture in the beaker was reacted for 10 min, obtaining a crude UiO-66.

(3) The obtained crude UiO-66 was cooled to room temperature and centrifuged (8000 r/min, 10 min, which were the same in the following examples). The obtained precipitate was washed with N,N-dimethylformamide by centrifugation for 3 times. After centrifugal separation, the precipitate was dispersed in anhydrous methanol and washed by centrifugation for 3 times.

(4) The product after centrifugal separation was placed in a vacuum drying box, dried under vacuum at 90° C. for 12 h, and cooled to room temperature, obtaining the zirconium-based metal-organic framework material UiO-66.

Figure 1:
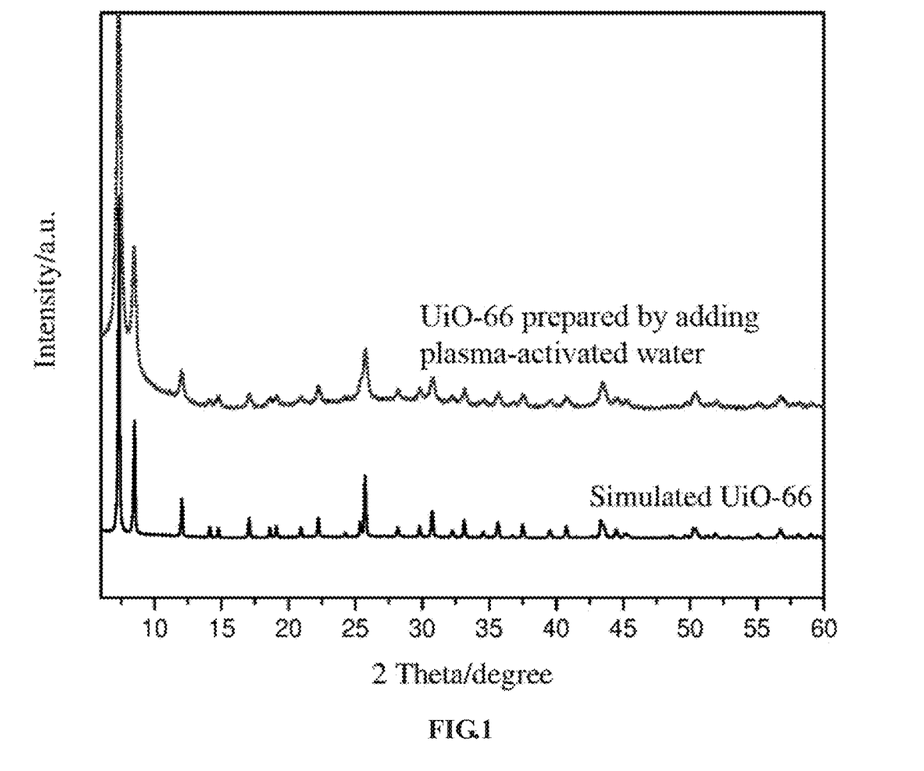
FIG. 1 shows a powder X-ray diffraction pattern of UiO-66 synthesized in Example 1.

The powder X-ray diffraction pattern of UiO-66 synthesized in this example is shown in FIG. 1. The peak positions in the XRD pattern of UiO-66 obtained in this example is the same as those of the UiO-66 standard model, which proves that the two have the same structure, and that the product with the target structure is obtained in this example. In addition, the XRD pattern of UiO-66 synthesized in this example in FIG. 1 shows sharp peaks and small half-width, indicating that the product has a good degree of crystallinity.

Figure 2:
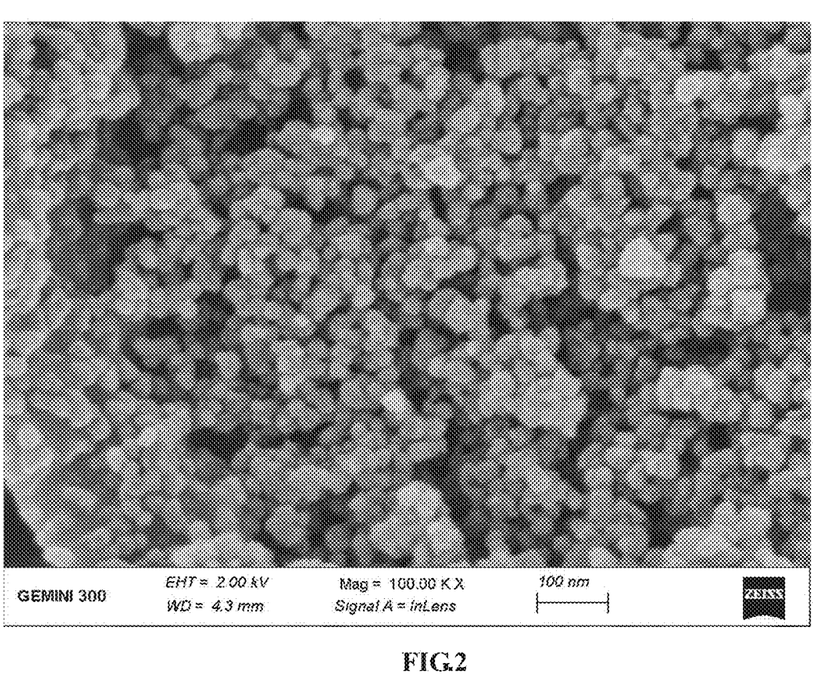
FIG. 2 is a scanning electron microscope image of UiO-66 synthesized in Example 1.

The morphology of the UiO-66 synthesized in this example is shown in FIG. 2, and it shows a cubic shape and a uniform particle size of about 20 nm. When the solvent was completely removed, the weight of the powder was 0.52 g, and the yield was about 75%.

Example 2

(1) Zirconium tetrachloride (600 mg, 2.57 mmol), terephthalic acid (427 mg, 2.57 mmol), N,N-dimethylformamide (56 mL), glacial acetic acid (2 mL) and plasma-activated water (2 mL) were added into a beaker, and they were stirred at room temperature for 3 min, and then placed into a 100 mL beaker.

(2) The beaker was placed into a water bath at a temperature of 80° C. and the resulting mixture in the beaker was reacted for 5 min, obtaining a crude UiO-66.

(3) The obtained crude UiO-66 was cooled to room temperature and centrifuged. The obtained precipitate was washed with N,N-dimethylformamide by centrifugation for 3 times. After centrifugal separation, the precipitate was dispersed in anhydrous methanol and washed by centrifugation for 3 times.

(4) The product after centrifugal separation was placed in a vacuum drying box, dried under vacuum at 90° C. for 12 h, and cooled to room temperature, obtaining the zirconium-based metal-organic framework material UiO-66.

Comparative Example 1

Zirconium tetrachloride (600 mg, 2.57 mmol), terephthalic acid (86.25 mg, 0.519 mmol), N,N-dimethylformamide (40 mL), and glacial acetic acid (2 mL) were added to a polytetrafluoroethylene-lined reactor, and they were stirred at room temperature for 3 min. The reactor was placed in an oven at 120° C., and the mixture in the reactor was reacted for 24 h, obtaining the crude UiO-66. The crude UiO-66 was cooled to room temperature and centrifuged, obtaining a precipitate. The precipitate was washed with N,N-dimethylformamide by centrifugation for 3 times. After centrifugal separation, the precipitate was dispersed in anhydrous methanol and washed by centrifugation for 3 times. The product after centrifugal separation was placed in a vacuum drying oven and dried under vacuum at 90° C. for 12 h. After being cooled to room temperature, the product, i.e. UiO-66 prepared by traditional solvothermal method, was obtained. The product was observed by scanning electron microscope, showing a particle size of about 100 nm.

Comparative Example 2

(1) Zirconium tetrachloride (600 mg, 2.57 mmol), terephthalic acid (86.25 mg, 0.519 mmol), N,N-dimethylformamide (40 mL), and glacial acetic acid (2 mL) were added into a beaker, and they were stirred at room temperature for 3 min, and placed into a 100 mL beaker.

(2) The beaker was placed into a water bath at a temperature of 80° C. and the resulting mixture in the beaker was reacted for 10 min. Then the reaction mixture was still clear. UiO-66 white precipitate was not be obtained after a centrifugation.

Comparative Example 3

(1) Zirconium tetrachloride (600 mg, 2.57 mmol), terephthalic acid (86.25 mg, 0.519 mmol), N,N-dimethylformamide (40 mL), glacial acetic acid (2 mL) and plasma-activated water (5 mL) were added into a beaker, and they were stirred at room temperature for 3 min, and placed into a 100 mL beaker.

(2) The beaker was placed into a water bath at a temperature of 80° C. and the resulting mixture in the beaker was reacted for 10 min. A slight white turbidity was observed, but the product obtained after a centrifugation was jelly-like, and powdered UiO-66 with good crystallinity was not be obtained.

Strong acid electrolyzed water used in Examples 3, 4 and Comparative Example 6 was prepared according to the following procedures:

2 g of NaCl and 0.4 mL of hydrochloric acid were added to 4 L of water, and the resulting solution was added to the left and right electrolyzers respectively. An electrolysis was performed for 10 min using a circulating concentrated electrolyzed water generator. The acidic water on the anode side was taken as the product water, i.e. the strong acid electrolyzed water, and the characteristics of the obtained electrolyzed water were measured. The prepared electrolyzed water was stored in a brown sealed reagent bottle, and diluted by adding deionized water to obtain electrolyzed water with an available chlorine concentration of 160 mg/L.

Example 3

(1) Zirconium tetrachloride (600 mg, 2.57 mmol), terephthalic acid (86.25 mg, 0.519 mmol), N,N-dimethylformamide (40 mL), glacial acetic acid (2 mL) and strong acid electrolyzed water (2 mL) were added into a beaker, and they were stirred at room temperature for 3 min, and placed into a 100 mL beaker.

(2) The beaker was placed into a water bath at a temperature of 80° C. and the resulting mixture in the beaker was reacted for 10 min, obtaining a crude UiO-66.

(3) The obtained crude UiO-66 was cooled to room temperature and centrifuged. The obtained precipitate was washed with N,N-dimethylformamide by centrifugation for 3 times. After centrifugal separation, the precipitate was dispersed in anhydrous methanol and washed by centrifugation for 3 times.

(4) The product after centrifugal separation was placed in a vacuum drying box, dried under vacuum at 90° C. for 12 h, and cooled to room temperature, obtaining the zirconium-based metal-organic framework material UiO-66.

Figure 3:
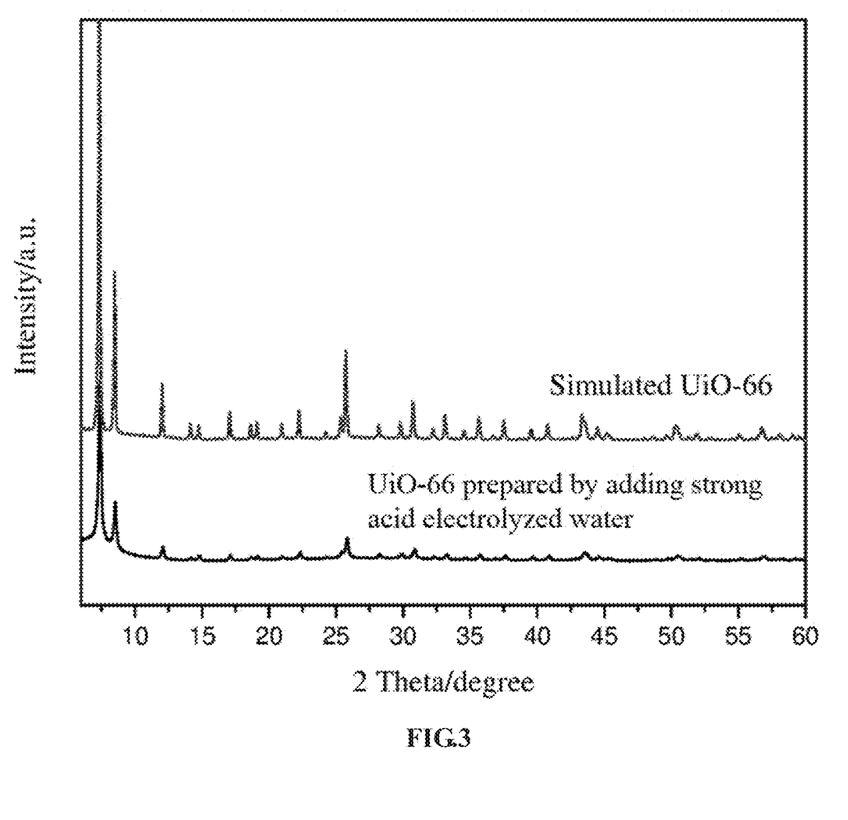
FIG. 3 shows a powder X-ray diffraction pattern of UiO-66 synthesized in Example 3.

The powder X-ray diffraction pattern of UiO-66 synthesized in this example is shown in FIG. 1. The peak positions in the XRD pattern of UiO-66 obtained in this example is the same as those of the UiO-66 standard model, which proves that the two have the same structure, and that the product with the target structure is obtained in this example. In addition, the XRD pattern of UiO-66 synthesized in this example in FIG. 3 shows sharp peaks and small half-width, indicating that the product has a good degree of crystallinity.

Figure 4:
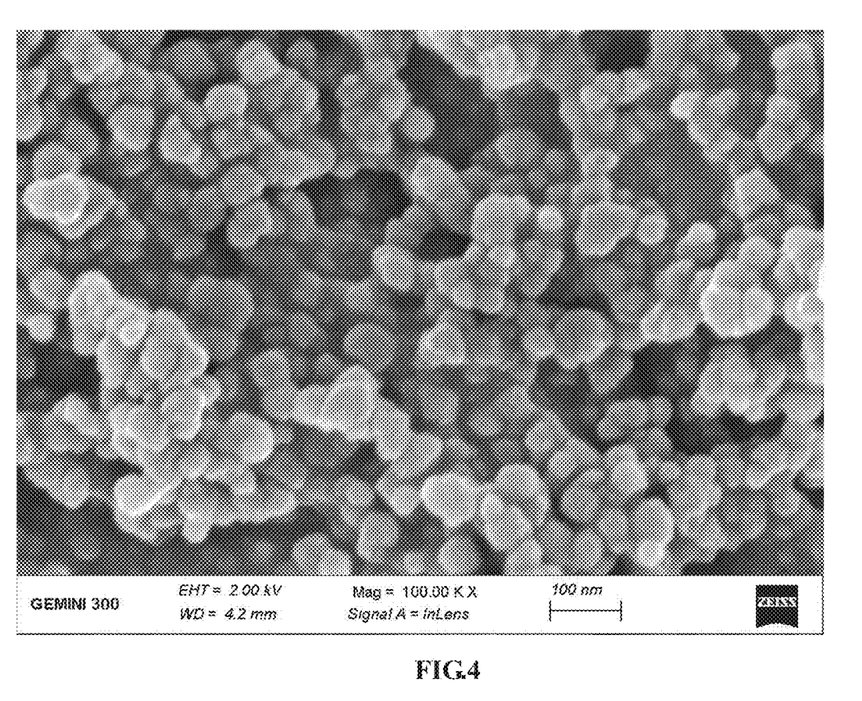
FIG. 4 is a scanning electron microscope image of UiO-66 synthesized in Example 3.

The morphology of the synthesized UiO-66 in this example is shown in FIG. 4, and it shows a cubic shape and a uniform particle size of about 50 nm. When the solvent was completely removed, the weight of the powder was 0.52 g, and the yield was about 75%.

Example 4

(1) Zirconium tetrachloride (600 mg, 2.57 mmol), terephthalic acid (427 mg, 2.57 mmol), N,N-dimethylformamide (56 mL), glacial acetic acid (2 mL) and strong acid electrolyzed water (2 mL) were added into a beaker, and they were stirred at room temperature for 3 min, and placed into a 100 mL beaker.

(2) The beaker was placed into a water bath at a temperature of 80° C. and the resulting mixture in the beaker was reacted for 5 min, obtaining a crude UiO-66.

(3) The obtained crude UiO-66 was cooled to room temperature and centrifuged. The obtained precipitate was washed with N,N-dimethylformamide by centrifugation for 3 times. After centrifugal separation, the precipitate was dispersed in anhydrous methanol and washed by centrifugation for 3 times.

(4) The product after centrifugal separation was placed in a vacuum drying box, dried under vacuum at 90° C. for 12 h, and cooled to room temperature, obtaining the zirconium-based metal-organic framework material UiO-66.

Comparative Example 4

Zirconium tetrachloride (600 mg, 2.57 mmol), terephthalic acid (86.25 mg, 0.519 mmol), N,N-dimethylformamide (40 mL), and glacial acetic acid (2 mL) were added to a polytetrafluoroethylene-lined reactor, and they were stirred at room temperature for 3 min. The reactor was placed in an oven at 120° C., and the mixture in the reactor was reacted for 24 h, obtaining the crude UiO-66. The crude UiO-66 was cooled to room temperature and centrifuged, obtaining a precipitate. The precipitate was washed with N,N-dimethylformamide by centrifugation for 3 times. After centrifugal separation, the precipitate was dispersed in anhydrous methanol and washed by centrifugation for 3 times. The product after centrifugal separation was placed in a vacuum drying oven and dried at 90° C. under vacuum for 12 h. After being cooled to room temperature, the product, i.e. UiO-66 prepared by traditional solvothermal method, was obtained.

Comparative Example 5

(1) Zirconium tetrachloride (600 mg, 2.57 mmol), terephthalic acid (86.25 mg, 0.519 mmol), N,N-dimethylformamide (40 mL), and glacial acetic acid (2 mL) were added into a beaker, and they were stirred at room temperature for 3 min, and placed into a 100 mL beaker.

(2) The beaker was placed into a water bath at a temperature of 80° C. and the resulting mixture in the beaker was reacted for 10 min. Then the reaction mixture was still clear, and UiO-66 white precipitate was not be obtained after centrifugation.

Comparative Example 6

(1) Zirconium tetrachloride (600 mg, 2.57 mmol), terephthalic acid (86.25 mg, 0.519 mmol), N,N-dimethylformamide (40 mL), glacial acetic acid (2 mL) and strong acid electrolyzed water (5 mL) were added into a beaker, and they were stirred at room temperature for 3 min, and placed into a 100 mL beaker.

(2) The beaker was placed into a water bath at a temperature of 80° C. and the resulting mixture in the beaker was reacted for 10 min. Then a slight white turbidity was observed, but the product obtained after centrifugation was jelly-like, and powdered UiO-66 with good crystallinity was not be obtained.

The technical features of the above embodiments could be combined arbitrarily. In order to make the description concise, all possible combinations of the various technical features in the above embodiments are not described. However, as long as there is no contradiction in the combination (s) of these technical features, it should be regarded as within the scope described in this specification.

The above embodiments only express several implementation manners of the present disclosure, and their descriptions are specific and detailed, but they should not be understood as a limitation on the scope of the present disclosure. It should be noted that for those of ordinary skill in the art, without departing from the concept of this disclosure, several modifications and improvements could be made, and that these all fall within the scope of this disclosure. Therefore, the scope of the disclosure shall be defined in the appended claims.

What is claimed is:

1. A method for preparing a zirconium-based metal-organic framework material, comprising:
adding plasma-activated water or strong acid electrolyzed water to a raw material system for preparing a zirconium-based metal-organic framework material UiO-66, and subjecting the resulting mixture to a reaction to obtain a crude product, and
subjecting the crude product to a post-treatment to obtain the zirconium-based metal-organic framework material UiO-66, wherein
a volume ratio of the plasma-activated water or the strong acid electrolyzed water to the raw material system is in the range of 0.8-1.5:21.

2. The method as claimed in claim 1, wherein the plasma-activated water has a pH value of 0-5 and an oxidation-reduction potential of 250-500 mV.

3. The method as claimed in claim 1, wherein the plasma-activated water is prepared by a process comprising treating deionized water continuously for 1-10 minutes by using a dielectric barrier discharge plasma generator.

4. The method as claimed in claim 1, wherein the strong acid electrolyzed water has an available chlorine of 100-200 mg/L, a pH value of 2.0-5.0, and an oxidation-reduction potential of 750-900 mV.

5. The method as claimed in claim 1, wherein the strong acid electrolyzed water is prepared by a process comprising adding NaCl and hydrochloric acid to water, dividing the resulting mixture into two parts and adding into an anode electrolyzer and a cathode electrolyzer respectively, applying a direct-current voltage between an anode electrode and a cathode electrode to perform an electrolysis under stirring, and taking acidic water from an anode side as product water.

6. The method as claimed in claim 1, wherein the post-treatment comprises cooling the crude product, and subjecting the cooled crude product to a centrifugal separation to obtain a solid, washing the solid and vacuum drying at 70-200° C. for 12-24 h.

7. The method as claimed in claim 1, wherein the reaction is performed at a temperature of 70-80° C.

8. The method as claimed in claim 1, wherein the reaction is performed for 5-10 minutes.

\* \* \* \* \*